US012009545B2

United States Patent
Yun et al.

(10) Patent No.: US 12,009,545 B2
(45) Date of Patent: Jun. 11, 2024

(54) SEPARATOR INCLUDING ION CONDUCTIVE POLYMER FILLING PORES OF SUBSTRATE AND COATING LAYER, MANUFACTURING METHOD OF THE SAME, LITHIUM SECONDARY BATTERY INCLUDING THE SAME

(71) Applicant: LG CHEM, LTD., Seoul (KR)

(72) Inventors: Hyunwoong Yun, Daejeon (KR); Hoejin Hah, Daejeon (KR); Jong Keon Yoon, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 580 days.

(21) Appl. No.: 17/263,543

(22) PCT Filed: May 22, 2020

(86) PCT No.: PCT/KR2020/006719
§ 371 (c)(1),
(2) Date: Jan. 26, 2021

(87) PCT Pub. No.: WO2020/235971
PCT Pub. Date: Nov. 26, 2020

(65) Prior Publication Data
US 2021/0234234 A1    Jul. 29, 2021

(30) Foreign Application Priority Data

May 23, 2019  (KR) .................. 10-2019-0060704
May 11, 2020  (KR) .................. 10-2020-0055842

(51) Int. Cl.
*H01M 50/446*    (2021.01)
*H01M 4/38*    (2006.01)
(Continued)

(52) U.S. Cl.
CPC ......... *H01M 50/446* (2021.01); *H01M 4/382* (2013.01); *H01M 4/661* (2013.01); *H01M 10/0525* (2013.01); *H01M 50/403* (2021.01)

(58) Field of Classification Search
CPC .. H01M 50/446; H01M 50/403; H01M 4/382; H01M 4/661
(Continued)

(56) References Cited

U.S. PATENT DOCUMENTS 6,432,586 B1    8/2002  Zhang
8,372,475 B2    2/2013  Kim et al.
(Continued)

FOREIGN PATENT DOCUMENTS

CN    104659313 A  *  5/2015   ............ H01M 2/145
CN    106848377 A     6/2017
(Continued)

OTHER PUBLICATIONS

Extended European Search Report issued by the European Patent Office dated Oct. 11, 2021 in a corresponding European Patent Application No. 20810770.6.
(Continued)

*Primary Examiner* — Sean P Cullen
(74) *Attorney, Agent, or Firm* — Morgan, Lewis & Bockius LLP

(57) ABSTRACT

The present disclosure relates to a separator for lithium secondary battery, a method for manufacturing same, and a lithium secondary battery including the same.
Specifically, in one embodiment of the present disclosure, by filling the pores of the separator, the present invention physically inhibits the metal column capable of growing on the surface of the negative electrode from moving toward the positive electrode, inhibits a micro-short circuit of the lithium secondary battery, and ultimately improves the lifetime of the lithium secondary battery.
(Continued)

In addition, by controlling the type of filling the pores of the separator and the type of the polymer filling it, the output characteristics of the lithium secondary battery are secured and improved.

11 Claims, 2 Drawing Sheets

(51) Int. Cl.
  *H01M 4/66* (2006.01)
  *H01M 10/0525* (2010.01)
  *H01M 50/403* (2021.01)
(58) Field of Classification Search
  USPC .................................... 429/144, 251, 254
  See application file for complete search history.

(56) References Cited

U.S. PATENT DOCUMENTS

| | | | |
|---|---|---|---|
| 10,205,190 | B2 | 2/2019 | Lee et al. |
| 2006/0008700 | A1 | 1/2006 | Yong et al. |
| 2009/0111025 | A1 | 4/2009 | Lee et al. |
| 2010/0330418 | A1* | 12/2010 | Liang ............... H01M 10/0565 429/207 |
| 2011/0027658 | A1 | 2/2011 | Kim et al. |
| 2011/0045168 | A1 | 2/2011 | Seo et al. |
| 2011/0064988 | A1 | 3/2011 | Yu |
| 2015/0162588 | A1 | 6/2015 | Lee et al. |
| 2015/0318570 | A1 | 11/2015 | Choi et al. |
| 2015/0333310 | A1 | 11/2015 | Choi et al. |
| 2017/0025658 | A1 | 1/2017 | Shi et al. |
| 2017/0279101 | A1* | 9/2017 | Sago ................... H01M 50/446 |
| 2018/0115006 | A1 | 4/2018 | Lee et al. |
| 2018/0226624 | A1* | 8/2018 | Zhao ................... H01M 50/449 |

FOREIGN PATENT DOCUMENTS

| | | | | |
|---|---|---|---|---|
| CN | 106887556 | A * | 6/2017 | ............ H01M 2/145 |
| CN | 107230767 | A * | 10/2017 | ............ C08J 7/0423 |
| CN | 108155326 | A | 6/2018 | |
| CN | 109546063 | A * | 3/2019 | ........ H01M 10/0525 |
| EP | 3667768 | A1 | 6/2020 | |
| EP | 3678219 | A1 | 7/2020 | |
| EP | 3678220 | A1 | 7/2020 | |
| JP | 2001-319634 | A | 11/2001 | |
| JP | 2004-087402 | A | 3/2004 | |
| JP | 2008-503049 | A | 1/2008 | |
| JP | 2008-524824 | A | 7/2008 | |
| JP | 2009-517810 | A | 4/2009 | |
| KR | 10-2011-0011932 | A | 2/2011 | |
| KR | 10-1027120 | B1 | 4/2011 | |
| KR | 10-1365300 | B1 | 2/2014 | |
| KR | 10-2014-0062295 | A | 5/2014 | |
| KR | 10-2014-0073957 | A | 6/2014 | |
| KR | 10-2015-0015918 | A | 2/2015 | |
| KR | 10-2015-0091897 | A | 8/2015 | |
| KR | 10-2016-0026648 | A | 3/2016 | |
| KR | 10-2016-0050870 | A | 5/2016 | |
| KR | 10-2017-0015149 | A | 2/2017 | |
| KR | 10-2017-0056693 | A | 5/2017 | |
| KR | 10-2018-023627 | A | 3/2018 | |
| KR | 10-2018-0043183 | A | 4/2018 | |
| KR | 10-2018-0045813 | A | 5/2018 | |
| KR | 10-2019-0046315 | A | 5/2019 | |
| KR | 10-2019-0046316 | A | 5/2019 | |
| KR | 10-2019-0052249 | A | 5/2019 | |

OTHER PUBLICATIONS

International Search Report issued in corresponding International Patent Application No. PCT/KR2020/006719, dated Sep. 22, 2020.

* cited by examiner

SEPARATOR INCLUDING ION CONDUCTIVE POLYMER FILLING PORES OF SUBSTRATE AND COATING LAYER, MANUFACTURING METHOD OF THE SAME, LITHIUM SECONDARY BATTERY INCLUDING THE SAME

CROSS-CITATION WITH RELATED APPLICATION(S)

This application claims the benefit of Korean Patent Application No. 10-2019-0060704 filed on May 23, 2019 and Korean Patent Application No. 10-2020-0055842 filed on May 11, 2020 with the Korean Intellectual Property Office, the disclosures of which are incorporated herein by reference in their entirety.

TECHNICAL FIELD

The present disclosure relates to a separator for lithium secondary battery, a method for manufacturing same, and a lithium secondary battery including the same.

BACKGROUND ART

Due to the rapid increase in the use of fossil fuels, the demand for the use of alternative energy or clean energy is increasing, and as part thereof, the fields that are being studied most actively are the fields of power generation and power storage using electrochemistry.

At present, a secondary battery is a representative example of an electrochemical device that utilizes such electrochemical energy, and the range of use thereof tends to be gradually expanding.

Recently, with the increase of the technological development and demand for mobile devices such as portable computers, portable phones, and cameras, demand for secondary batteries as an energy source rapidly increases. Among such secondary batteries, many studies have been conducted on a lithium secondary battery that exhibits high charge/discharge characteristics and lifetime characteristics and is environmentally friendly, and has been commercialized and widely used.

The electrode assembly built into a battery case is a chargeable and dischargeable power generation element composed of a laminated structure of positive electrode/separator/negative electrode, and is classified as a jelly-roll type electrode assembly having a configuration of winding a long-sheet type positive electrode and a long-sheet type negative electrode in a state in which a separator is interposed therebetween, a stack type electrode assembly having a configuration in which pluralities of positive electrodes and negative electrodes each having a predetermined size are consecutively stacked in a state in which separators are disposed between the two electrodes, or as a combination thereof, a stack/folding type electrode assembly having a construction of winding bi-cells or full cells, including a positive electrode, a negative electrode and a separator, into a long-sheet type separation film, and a laminate/stack type electrode assembly having a configuration of stacking after laminating the bi-cell or full cell.

Meanwhile, in general, a lithium secondary battery has a structure in which a non-aqueous electrolyte is impregnated into an electrode assembly comprising a positive electrode, a negative electrode, and a porous separator. The positive electrode is generally manufactured by coating a positive electrode mixture including a positive electrode active material onto aluminum foil, and the negative electrode is manufactured by coating a negative electrode mixture including a negative electrode active material onto a copper foil.

Usually, the positive electrode active material uses a lithium transition metal oxide, and the negative active material uses a carbon-based material. However, recently, as a negative electrode active material, a lithium metal battery using lithium metal itself has been commercialized.

Usually, a lithium ion battery uses a carbon-based material (theoretical capacity: 372 mAh/g) as a negative active material, whereas a lithium metal battery uses lithium metal (theoretical capacity: 3600 mAh/g) as a negative electrode active material, and thus, have an advantage that the amount of energy is theoretically increased by 10 times or more.

Such a lithium metal battery may be the copper current collector itself or lithium metal negative electrode adhered to its surface, and performs a discharge/charge by using electrochemical reactions, in which the lithium metal desorbed from the surface of the negative electrode is ionized and moved to the positive electrode via the electrolyte (discharge), and lithium ions that have lost electrons from the positive electrode move to the negative electrode via the electrolyte and are reduced and electrodeposited from the surface of the negative electrode (charging).

Meanwhile, the lithium secondary battery may cause a short circuit due to various factors. As an example, the point at which the transition metal eluted from the positive electrode active material is electrodeposited on the negative electrode surface is the starting point of the metal column, and lithium metal is further electrodeposited at the starting point, and as a result, the metal column may grow through the pores of the separator and makes contact with the positive electrode, thereby causing a micro-short-circuit.

This micro-short circuit can be more dangerous in lithium metal batteries as lithium metal has a higher reactivity compared to carbon-based materials.

Such a micro-short circuit may also shorten the lifetime of the lithium secondary battery.

DETAILED DESCRIPTION OF THE INVENTION

Technical Problem

In one embodiment of the present disclosure, by filling the pores of the separator, the present invention physically inhibits the metal column capable of growing on the surface of the negative electrode from moving toward the positive electrode, inhibits a micro-short circuit of the lithium secondary battery, and ultimately improves the lifetime of the lithium secondary battery.

In addition, by controlling the type of filling the pores of the separator and the type of the polymer filling it, the output characteristics of the lithium secondary battery are secured and improved.

Technical Solution

Throughout the specification, when a part is referred to as "including" a certain component, it means that it can further include other components, without excluding the other components, unless otherwise stated.

The term "about or approximately" or "substantially" used herein is intended to have meanings close to numerical values or ranges specified with an allowable error and intended to prevent accurate or absolute numerical values disclosed for understanding of the present disclosure from being illegally or unfairly used by any unconscionable third party. Further, throughout the specification, the term "step of" does not mean "step for".

Throughout the specification, the term "combination(s) thereof" included in Markush type description means mixture or combination of one or more selected from a group consisting of components described in Markush type and thereby means including one or more selected from a group consisting of the components.

Based on the above definitions, embodiments of the present disclosure will be described in detail. However, these are presented for illustrative purposes only, and the present disclosure is not limited thereto, and the present disclosure is only defined by the scope of the claims described later.

Separator for Lithium Secondary Battery

In one embodiment of the present disclosure, there is provided a separator for a lithium secondary battery comprising: a substrate having a plurality of first pores formed therein; a coating layer located on the surface of the substrate, including inorganic particles and a binder, and having a plurality of second pores formed therein; and an ion conductive polymer (F-ionomer) that selectively fills either one of all of the first pores and all of the second pores.

The one embodiment is 1) based on a safety reinforced separator (SRS), and 2) solves the problem of a micro-short circuit of a lithium secondary battery by filling the pores thereof, and ultimately improves the lifetime characteristics of the battery.

Here, 3) in order to secure the passage of lithium ions, all of the first pores and all of the second pores are not filled, and either one of all of the first pores and all of the second pores is selectively filled. 4) In addition, by using an ion conductive polymer, and furthermore, in particular, a fluorine-based ionomer as a means for selectively filling the pores formed on either side of the substrate or the coating layer, it secures a similar level of ionic conductivity to the case where all pores of the substrate and the coating layer are opened.

1) Specifically, the separator of one embodiment is based on a so-called safety reinforced separator (SRS) in which the surface of the substrate is coated with inorganic particles to enhance thermal stability, mechanical stability, and the like.

The substrate may be a porous substrate having a plurality of pores formed therein. Further, the inorganic particles may be fixed to the surface of the substrate, mutually different inorganic particles or the like via a binder. Further, in the inside of the coating layer, a plurality of pores may be formed between the inorganic particles and the substrate, and even between the mutually different inorganic particles.

In order to emphasize these structural features, a plurality of pores formed inside the substrate are referred to as first pores, and the pores formed inside the coating layer are referred to as second pores.

2) The first and second pores are spaces that are impregnated with an electrolyte in a lithium secondary battery to provide a passage for lithium ions, but a metal column grown on the surface of the negative electrode may also be a space that can continue to grow toward the positive electrode.

As described above, the metal columns grown on the surface of the negative electrode may pierces through a weak portion of the separator and reach the positive electrode, thereby causing a micro-short-circuit. In the stability-reinforced separator (SRS), the weak portion may be the first and second pores.

Thus, in the one embodiment, the metal column grown on the surface of the negative surface may no longer grow toward the positive electrode, and in order to change the growing direction in a direction perpendicular to the positive electrode, it is attempted to fill a weak portion of the stability reinforced separator (SRS).

3) However, when all of the first pores and all of the second pores are filled, a micro-short-circuit can be prevented, but lithium ion conduction via the separator is suppressed, and the lithium secondary battery may not operate normally. On the contrary, when all of the first pores and only a part of the second pores are filled, or when all of the second pores and only a part of the first pores are filled, a micro-short circuit may occur similar to the case where all of the first pores and all of the second pores are opened.

Therefore, in the one embodiment, by selectively filling only either one of all of the first pores and all of the second pores, it is attempted to ensure lithium ion conduction via a separator and the normal operation of the lithium secondary battery including the same.

4) On the other hand, even if either one of all of the first pores and all of the second pores is selectively filled, lithium ion conductivity may be lowered compared to a case where all of the first pores and all of the second pores are opened.

Thus, in the one embodiment, an ion conductive polymer having excellent lithium ion conductivity is used as a means for selectively filling either one of all of the first pores and all of the second pores, so that it is attempted to secure an ion conductivity similar to the case where all pores of the substrate and the coating layer are opened. Among the ion conductive polymers, in particular, the fluorine-based ionomer contains fluorine, so that flame retardancy can be improved, and the F element bonded to the carbon chain has a relatively strong binding force and thus has an advantage of having electrochemical stability.

Hereinafter, the separator of the one embodiment will be described in more detail.

Structure of Coating Layer

The coating layer may be coated onto one or both surfaces of the substrate by a coating method known in the art. Coating methods known in the art include dip coating, die coating, roll coating, and comma coating, and the like.

When using the dip coating method, the coating layer may be located on one or both surfaces of the substrate, and at the same time, may also be located inside the substrate. Here, the coating layer located inside the substrate may fill a part of the first pores with the inorganic particles and the binder, and the second pores can be located in the remaining part of the first pores.

The dip coating method is also used in the examples described later, which is a method of immersing the substrate in a solution containing inorganic particles, a binder and a solvent (hereinafter, in some cases, referred to as a "coating layer forming solution") and then drying it.

In the immersion process, not only the coating layer forming solution may be coated onto the surface of the substrate, but also the coating layer forming solution may be impregnated in the first pores inside the substrate. Then, when the substrate immersed in the coating layer forming solution is recovered and dried, the solvent in the coating layer forming solution impregnated in the first pores may be removed, leaving only the inorganic particles and binders.

However, since the particle diameter of the inorganic particles and the binder is generally the same as or larger than the first pore, it is inferred that pores in the region adjacent to the surface of the substrate, only inorganic particles and binders equal to or smaller than the first pores are left in the first pores.

Material Filling the Pores of the Separator

An ion conductive polymer may be used as a means for selectively filling either one of all of the first pores and all of the second pores.

A variety of ion conductive polymers known in the art can be used without limitation, but specifically, it is more preferable to use specifically a fluorine-based ionomer for the purposes such as flame retardancy and stability.

More specifically, as the fluorine-based ionomer, a Nafion®-based material represented by the following Chemical Formula 1 may be used:

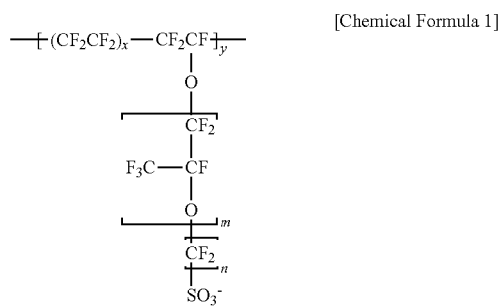

[Chemical Formula 1]

in the Chemical Formula 1, m is 0 or 1, $3 \leq n \leq 5$, and $1.5 \leq x \leq 14$. In the case of y, it can be freely adjusted according to the applicable solvent, manufacturing process, etc., based on the common knowledge in the art, and in the one embodiment, it is not particularly limited.

The Nafion®-based material represented by Chemical Formula 1 is a type of polymer in which a sulfonic acid group is introduced into the skeleton of polytetrafluoroethylene, is thermally stable, has high chemical resistance, and has high ionic conductivity.

Porosity of Separator

Since the separator of the one embodiment is formed by filling either one of all of the first pores and all of the second pores, it can have a reduced porosity than when all of the first pores and all of the second pores are opened.

Specifically, the separator of the one embodiment may have a porosity of 25% or less (however, 0% or more), specifically 0% or more to 20% or less, such as 0% or more and 10% or less, as calculated according to the following calculation formula. Within this range, it is possible to physically inhibit metal columns grown on the negative electrode surface from moving toward the positive electrode:

Porosity (%)=(1−(Measuring density of the separator/Theoretical density of the separator))×100

Here, a value obtained by dividing the measured mass of the entire separator by the product of the measuring area and the measuring thickness is "measured density of the separator"; and the "theoretical density of the separator" is an average value after multiplying the theoretical density of the coating layer and the theoretical density of the substrate by the respective volume fractions.

As can be seen from the calculation method, not only the measuring density of the separator but also the theoretical density of the separator may vary depending on the composition of the separator.

Ion Conductivity of Separator

Meanwhile, as mentioned above, when all of the first pores and all of the second pores are filled, lithium ion conduction via the separator is suppressed, and the lithium secondary battery may not operate normally. Actually, when the ionic conductivity of such separator (Comparative Example 2) in the Experimental Example described later was measured, it was found that the ionic conductivity at 20 to 30° C. was only $1 \times 10^{-4}$ S/cm.

On the other hand, in the Experimental Example conducted under the same conditions, it was confirmed that the ionic conductivity of the separator in which either one of the first pores and all of the second pores was selectively filled was $5.0 \times 10^{-4}$ S/cm or more, specifically $5.5 \times 10^{-4}$ S/cm or more, specifically $5.8 \times 10^{-4}$ S/cm, for example, the ionic conductivity of the separator in which the first pores were filled was $6.0 \times 10^{-4}$ S/cm or more.

In particular, it was confirmed that the ion conductivity of the separator in which all of the first pores are selectively filled is $9.1 \times 10^{-4}$ S/cm, which are close to the ionic conductivity ($10.5 \times 10^{-4}$ S/cm) of the separator in which all of the first pores and all of the second pores are opened. Here, the reason why the ionic conductivity of the separator in which all of the second pores are selectively filled is higher compared to the separator in which all of the first pores are selectively filled is because the volume (portion) occupied by the layer in which the pores are filled is small.

However, even if all of the second pores are selectively filled, it is sufficient to secure the ionic conductivity of the separator. In this case, the sum of the volumes occupied by the ion conductive polymer and the binder among the total volume (100% by volume) of the coating layer containing the ion conductive polymer may be controlled to be 50% by volume or more to 100% by volume or less. If this range is not satisfied, only a part of the second pores may be selectively filled, resulting in a structure in which all of the first pores and a part of the second pores are opened.

Regardless of the form in which the pores of the separator are filled, the volume ratio of the ion conductive polymer and the binder is not particularly limited, and can be freely controlled within the range of 1:99 to 99:1 (the order of substrates is ion conductive polymer: PVdF).

Inorganic Particles

The inorganic particles are not particularly limited regardless of the form in which the pores of the separator are filled. That is, it is not particularly limited as long as it is made of an inorganic material and does not cause oxidation and/or reduction reactions in the operating voltage range of the lithium secondary battery (e.g., 0 to 5 V based on Li/Li⁺). However, in consideration of the characteristics of a desired lithium secondary battery, the type of inorganic particles may be selected.

For example, as the inorganic particles having excellent ion transferring capability are used more, the ion conductivity in the lithium secondary battery is higher, and thus the output characteristics of the battery can be improved. In addition, as inorganic particles having a low density are used, the dispersibility in the solvent is increased, so that the coating layer is easily formed, and further, it is advantageous in reducing the weight and increasing the capacity per weight during battery production. When inorganic particles with high dielectric constant are used, it contributes to an increase in the degree of dissociation of the lithium salt in the electrolyte, thereby further improving the ionic conductivity.

Considering the above, high dielectric constant inorganic particles having a dielectric constant of 5 or more, such as 10 or more, inorganic particles having a lithium ion transferring capability, inorganic particles having piezoelectricity, or a mixture thereof may be used.

Non-limiting examples of the inorganic particles having a dielectric constant of 5 or more, for example 10 or more, include any one selected from the group consisting of $Al_2O_3$, $SrTiO_3$, $SnO_2$, $CeO_2$, $MgO$, $NiO$, $CaO$, $ZnO$, $ZrO_2$, $Y_2O_3$, $TiO_2$, $SiO_2$, SiC and a mixture thereof. When the inorganic particles having a high dielectric constant, inorganic particles having piezoelectricity and inorganic particles having lithium ion transferring capability are mixed and used, a synergistic effect resulting therefrom can be doubled.

In the present disclosure, the inorganic particles having lithium ion transferring capability refer to an inorganic particle containing lithium element and having a capability of moving a lithium ion without storing the lithium. The inorganic particles having lithium ion transferring capability may transfer and move lithium ions due to a kind of defect existing in the particle structure, so it is possible to improve lithium ion conductivity in the battery and also improve the performance of the battery. Non-limiting examples of the inorganic particles having the lithium ion transferring capability include any one selected from the group consisting of lithium phosphate($Li_3PO_4$), lithium titanium phosphate($Li_xTi_y(PO_4)_3$, $0<x<2$, $0<y<3$), lithium aluminum titanium phosphate($Li_xAl_yTi_z(PO_4)_3$, $0<x<2$, $0<y<1$, $0<z<3$), (LiAlTiP)$_xO_y$ type glass ($0<x<4$, $0<y<13$) such as $14Li_2O$-$9Al_2O_3$-$38TiO_2$-$39P_2O_5$, lithium lanthanum titanate ($Li_xLa_yTiO_3$, $0<x<2$, $0<y<3$), lithium germanium thiophosphate($Li_xGe_yP_zS_w$, $0<x<4$, $0<y<1$, $0<z<1$, $0<w<5$) such as $Li_{3.25}Ge_{0.25}P_{0.75}S_4$, lithium nitrides ($Li_xN_y$, $0<x<4$, $0<y<2$) such as $Li_3N$, $SiS_2$ type glass ($Li_xSi_yS_z$, $0<x<3$, $0<y<2$, $0<z<4$) such as $Li_3PO_4$—$Li_2S$—$SiS_2$, $P_2S_5$ type glass ($Li_xP_yS_z$, $0<x<3$, $0<y<3$, $0<z<7$) such as LiI—$Li_2S$—$P_2S_5$ and a mixture thereof.

The inorganic particles having piezoelectricity refer to a material which is an insulator under normal pressure, but has physical properties of allowing current flow due to the change of its internal structure when a certain range of pressure is applied thereto. Not only the inorganic particles show a high dielectric constant of 100 or more, but also they are charged positively on one surface while being charged negatively on the other surface, when they are drawn or compressed by applying a certain range of pressure. Hence, they may be inorganic particles having the function of causing an electric potential difference between both surfaces thereof.

When the inorganic particles having the above characteristics are used as the inorganic coating layer component, a positive electrode and a negative electrode are prevented from being in direct contact with each other by the inorganic particles coated on the separator, when an internal short circuit occurs between both electrodes due to external impacts such as local crush, a nail, or the like. Additionally, such piezoelectricity of the inorganic particles can permit generation of a potential difference in the particles, thereby allowing electron movements, i.e. minute flow of electric current between the positive electrode and the negative electrode, so that it is possible to accomplish a slow decrease in the voltage of a battery and to improve the safety of a battery.

Non-limiting examples of the inorganic particles having piezoelectricity include $BaTiO_3$, $Pb(Zr,Ti)O_3$(PZT), $Pb_{1-x}La_xZr_{1-y}Ti_yO_3$(PLZT, $0<x<1$, $0<y<1$), $Pb(Mg_3Nb_{2/3})O_3$—$PbTiO_3$(PMN-PT), hafnia($HfO_2$) or mixtures thereof.

In the separator, the size of inorganic particles, the content of inorganic particles, and the composition ratio of inorganic particles can be adjusted to thereby form the second pores of the coating layer in addition to the first pores included in the substrate. It is also possible to adjust both the size of the first and second pores and the porosity resulting therefrom.

Although the size of inorganic particles is not particularly limited, inorganic particles having a size of 0.001 to 10 µm can be used for the purpose of forming a film having a uniform thickness and securing a suitable porosity. If the size of inorganic particles is less than 0.001 µm, inorganic particles have poor dispersibility so that it may be difficult to adjust the physical properties of the inorganic coating layer. If the size is greater than 10 µm, the separator produced under the same solid content has an increased thickness, resulting in degradation in mechanical properties. Furthermore, such excessively large pores may increase a possibility of internal short circuit being generated during charge/discharge of the battery.

Binder

The binder is not particularly limited regardless of the form in which the pores of the separator are filled. In the case of the binder, there is no particular limitation as long as it is a material having a function of adhering mutually different inorganic particles to each other and adhering the inorganic particles to the substrate.

However, when the binder is a polymer having ion transferring capability, the performance of the lithium secondary battery may be further improved.

Non-limiting examples of such polymers include any one selected from the group consisting of polyvinylidene fluoride-co-hexafluoropropylene, polyvinylidene fluoride-co-trichloroethylene, polymethylmethacrylate, polyacrylonitrile, polyvinylpyrrolidone, polyvinylacetate, polyethylene-co-vinyl acetate, polyethylene oxide, cellulose acetate, cellulose acetate butyrate, cellulose acetate propionate, cyanoethylpullulan, cyanoethylpolyvinylalcohol, cyanoethylcellulose, cyanoethylsucrose, pullulan, carboxyl methyl cellulose, acrylonitrile-styrene-butadiene copolymer, polyimide, polyvinylalcohol, and mixtures thereof. In addition, any material having the above-mentioned properties can be used alone or in combination.

Volume Ratio of Inorganic Particles and Binder in the Coating Layer

The volume ratio of the inorganic particles and the binder in the coating layer is also not particularly limited, regardless of the form in which the pores of the separator are filled.

However, in order to form a second pore of an appropriate size in the coating layer and thus secure ionic conductivity, the volume ratio of the inorganic particles and the binder can be adjusted within the range of 1:99 to 99:1, for example, it can be controlled from 40:60 to 60:40. Within this range, as the volume of the inorganic particles relative to the binder increases, the porosity of the separator increases, which results in an increase in the thickness of the separator. Additionally, the size of the second pores between the inorganic particles increases. At this time, as the size (particle diameter) of the inorganic particles increases, interstitial distance between the inorganic particles increases, thereby increasing the size of the second pores.

In addition to the inorganic particles and the binder, the coating layer may further include commonly known additives.

Substrate

In the one embodiment, the substrate is not particularly limited, and may be in the form of a porous film. Specifically, the substrate includes any one selected from the group consisting of polyolefin, polyester, polysulfone, polyimide, polyetherimide, polyamide, polytetrafluoroethylene, rayon, glass fiber, and mixtures thereof, or it may be a multilayer film thereof. More specifically, the porous substrate may be a porous polymer film made of a polyolefin-based polymer such as an ethylene homopolymer, a propylene homopolymer, an ethylene/butene copolymer, an ethylene/hexene copolymer and an ethylene/methacrylic acid copolymer, or a laminated structure having two or more layers thereof.

Further, the substrate may have a porosity of 20 to 80% by volume with respect to the total volume of the substrate, in a state in which the ion conductive polymer is not filled. If the porosity of the substrate is less than 20% by volume, there may be a problem that the pores decrease rapidly, Li ion transfer becomes difficult, and thus the resistance of the substrate increases. If the porosity of the substrate exceeds 80% by volume, the mechanical strength of the separator is reduced, which may cause a problem of tearing during cell assembling.

Further, the substrate may include a first pore having a D50 of 1 nm to 200 nm in the substrate. If the D50 of the first pore is less than 1 nm, the coating layer is not easily formed, or the improvement effect due to the formation of the coating layer is insignificant, and if the D50 of the first pore exceeds 200 nm, there is a risk that the mechanical strength of the separator itself is reduced.

Method for Manufacturing Separator for Lithium Secondary Battery

Another embodiment of the present disclosure provides a method for manufacturing a separator for a lithium secondary battery comprising: a first step of preparing a substrate including a plurality of first pores therein; a second step of forming a coating layer including inorganic particles, a binder, and a plurality of second pores on the surface of the substrate; and a third step of filling all of the first pores with an ion conductive polymer or of filling all of the second pores with an ion conductive polymer.

In the manufacturing method of the one embodiment, the first and second steps are based on a method of manufacturing a safety reinforced separator (SRS), and only through the steps, finally, the separator according to the one embodiment may be manufactured.

Hereinafter, based on the third step, the manufacturing method of the one embodiment will be described in detail.

When all of the First Pores are Selectively Filled

The third step of manufacturing a separator in which all of the first pores are selectively filled may be performed after the first step and before the second step.

Specifically, the third step in this case may include a step of immersing the substrate of the first step in a solution containing an ion conductive polymer; and a step of recovering and drying the substrate of the first step immersed in the solution containing the ion conductive polymer.

The solution containing the ion conductive polymer may include 1 to 30 vol % of the ion conductive polymer and the rest of the solvent.

The second step may include a step of immersing the substrate obtained from the third step in a solution containing inorganic particles and a binder; and a step of recovering and drying the substrate immersed in the solution containing the inorganic particles and the binder.

When all of the Second Pores are Selectively Filled

On the other hand, the third step of manufacturing the separator in which all of the second pores are selectively filled may be performed simultaneously with the second step.

Specifically, the third step in this case may include a step of immersing the substrate of the first step in a solution containing inorganic particles, a binder, and an ion conductive polymer; and a step of recovering and drying the substrate of the first step immersed in the solution containing the inorganic particles, the binder, and the ion conductive polymer.

Here, in the solid content of the solution, the volume ratio of the organic material (the sum of the ion conductive polymer and the binder) and the inorganic material may be 50:50 to 99:1. Within this range, all of the second pores can be effectively filled. The solid content in the solution may be 10 to 70% by volume.

Lithium Secondary Battery

In another embodiment of the present disclosure, there is provided a lithium secondary battery comprising: a positive electrode; a negative electrode; and the separator of the above-mentioned one embodiment interposed between the negative electrode and the positive electrode.

When charging the lithium secondary battery with a constant current of 0.1 C in a temperature range of 20 to 30° C. until reaching 4.25 V and then discharging the lithium secondary battery with a constant current of 0.5C until reaching 3 V is referred to as one charge/discharge cycle, at the point of the time the capacity retention rate according to the following Equation 1 reaches 80%, n may be 50 or more, specifically 55 or more, and more specifically 60 or more

[Capacity retention rate (%)=100*{Discharge capacity after n cycles}/{Discharge capacity after 1 cycle}     Equation 1]

The detailed description concerning the separator applied to the lithium secondary battery of the one embodiment is the same as described above, and hereinafter, battery components other than the separator will be described in detail.

Negative Electrode

In general, the negative electrode may include a negative electrode current collector and a negative electrode mixture layer disposed on the negative electrode current collector.

The negative electrode is manufactured by mixing an active material and a binder, optionally a conductive material, a filler, and the like in a solvent to produce an electrode mixture slurry and then coating this electrode mixture slurry onto each negative electrode current collector. Since the above-mentioned electrode-manufacturing method is widely known in the art, a detailed description thereof will be omitted herein.

The negative electrode current collector is generally fabricated to a thickness of 3 to 500 micrometers. The negative electrode current collector is not particularly limited so long as a corresponding battery has high conductivity without causing chemical changes in the battery. For example, the negative electrode current collector may be made of copper, stainless steel, aluminum, nickel, titanium, baked carbon, or a material formed by surface-treating g a surface of copper or stainless steel with carbon, nickel, titanium, silver, or the like, or may use an aluminum-cadmium alloy or the like. In addition, similar to the positive electrode current collector, the negative electrode current collector may have fine protrusions and depressions formed on a surface thereof to enhance adherence of a negative electrode active material, and may be formed in various forms such as a film, a sheet, a foil, a net, a porous body, a foaming body, and a non-woven fabric structure.

An example of the negative electrode active material may include carbons such as hardly graphitizable carbon and graphite-based carbon; metal composite oxides such as $Li_xFe_2O_3$ ($0 \leq x \leq 1$), $Li_xWO_2$ ($0 \leq x \leq 1$), $Sn_xMe_{1-x}Me'_yO_z$ (Me: Mn, Fe, Pb, Ge; Me': Al, B, P, Si, Group 1, 2, 3 elements in the periodic table, halogen; $0 < x \leq 1$; $1 \leq y \leq 3$; $1 \leq z \leq 8$); lithium titanium oxide, lithium metal; lithium alloys; silicon-based alloys; tin-based alloys; metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; a conductive polymer such as polyacetylene; Li—Co—Ni based materials and the like.

The binder is a component that assists in the binding between the active material and the other solids, wherein the binder may typically be added in an amount of 0.1 to 30% by weight based on the total weight of the negative electrode containing the negative electrode active material. Examples of the binder include polyvinylidene fluoride, polyvinylidene fluoride-hexafluoropropylene, polyvinyl alcohol, carboxymethylcellulose (CMC), starch, hydroxypropylcellulose, regenerated cellulose, polyvinylpyrrolidone, tetrafluoroethylene, polytetrafluoroethylene, polyethylene, polypropylene, an ethylene-propylene-diene terpolymer (EPDM), a sulfonated EPDM, a styrene-butadiene rubber, a fluorine rubber, various copolymers, and the like.

The conductive material is added in an amount of 0.1 to 30% by weight based on the total weight of the mixture containing the negative electrode active material. The conductive material is not particularly limited as long as a corresponding battery has high conductivity without causing a chemical change in the battery, and for example, graphite such as natural graphite and artificial graphite; carbon blacks such as carbon black, acetylene black, ketjen Black®, channel black, furnace black, lamp black, and thermal black; conductive fibers such as carbon fiber and metal fiber; metal powders such as carbon fluoride powder, aluminum powder, and nickel powder; conductive whiskey such as zinc oxide and potassium titanate; conductive metal oxides such as titanium oxide; conductive materials such as polyphenylene derivatives may be used.

Meanwhile, the negative electrode may be a copper current collector itself or a lithium metal negative electrode having a lithium metal attached to the surface thereof, and the lithium metal battery including such a lithium metal negative electrode performs a discharge/charge by using electrochemical reactions, in which the lithium metal desorbed from the surface of the negative electrode is ionized and moved to the positive electrode via the electrolyte (discharge), and lithium ions that have lost electrons from the positive electrode move to the negative electrode via the electrolyte and are reduced and electrodeposited from the surface of the negative electrode (charging).

At this time, the copper current collector is generally fabricated to a thickness of 3 to 500 µm. Such a copper current collector itself (Li free anode) can be used as a negative electrode. If lithium metal attached to the surface of the copper current collector is used as a negative electrode, a method widely known in the art such as vapor deposition, electroplating, and rolling may be used as a method of attaching lithium metal.

Positive Electrode

The positive electrode may include a positive electrode current collector and a positive electrode mixture layer disposed on the positive electrode current collector.

The positive electrode is manufactured by mixing an active material and a binder, optionally a conductive material, a filler, and the like in a solvent to produce an electrode mixture slurry, and then coating this electrode mixture slurry onto each positive electrode current collector. Since the above-mentioned electrode-manufacturing method is widely known in the art, a detailed description thereof will be omitted herein. In the case of the positive electrode active material, there is no particular limitation as long as it is a material capable of reversibly intercalating and de-intercalating lithium ions. For example, it may include one or more of complex oxides of cobalt, manganese, nickel, or a combination of metals; and lithium. In a more specific example, a compound represented by any of the following chemical formulas can be used as the positive electrode active material. $Li_aA_{1-b}R_bD_2$ (wherein, $0.90 \le a \le 1.8$ and $0 \le b \le 0.5$); $Li_aE_{1-b}R_bO_{2-c}D_c$ (wherein, $0.90 \le a \le 1.8$, $0 \le b \le 0.5$, and $0 \le c \le 0.05$); $LiE_{2-b}R_bO_{4-c}D_c$ (wherein, $0 \le b \le 0.5$, and $0 \le c \le 0.05$); $Li_aNi_{1-b-c}Co_bR_cD_\alpha$ (wherein, $0.90 \le a \le 1.8$, $0 \le b \le 0.5$, $0 \le c \le 0.05$ and $0 < \alpha \le 2$); $Li_aNi_{1-b-c}Co_bR_c O_{2-\alpha}Z_\alpha$ (wherein, $0.90 \le a \le 1.8$, $0 \le b \le 0.5$, $0 \le c \le 0.05$ and $0 < \alpha < 2$); $Li_aNi_{1-b-c}Co_bR_cO_{2-\alpha}Z_2$ (wherein, $0.90 \le a \le 1.8$, $0 \le b \le 0.5$, $0 \le c \le 0.05$ and $0 < \alpha < 2$); $Li_aNi_{1-b-c}Mn_bR_cD_\alpha$ (wherein, $0.90 \le a \le 1.8$, $0 \le b \le 0.5$, $0 \le c \le 0.05$ and $0 < \alpha \le 2$); $Li_aNi_{1-b-c}Mn_bR_cO_{2-\alpha}Z_\alpha$ (wherein, $0.90 \le a \le 1.8$, $0 \le b \le 0.5$, $0 \le c \le 0.05$ and $0 < \alpha < 2$); $Li_aNi_{1-b-c}Mn_bR_cO_{2-\alpha}Z_2$ (wherein, $0.90 \le a \le 1.8$, $0 \le b \le 0.5$, $0 \le c \le 0.05$ and $0 < \alpha < 2$); $Li_aNi_bE_cG_dO_2$ (wherein, $0.90 \le a \le 1.8$, $0 \le b \le 0.9$, $0 \le c \le 0.5$ and $0.001 \le d \le 0.1$); $Li_aNi_bCo_cMn_dGeO_2$ (wherein, $0.90 \le a \le 1.8$, $0 \le b \le 0.9$, $0 \le c \le 0.5$, $0 \le d \le 0.5$ and $0.001 \le e \le 0.1$); $Li_aNiG_bO_2$ (wherein, $0.90 \le a \le 1.8$ and $0.001 \le b \le 0.1$); $Li_aCoG_bO_2$ (wherein, $0.90 \le a \le 1.8$ and $0.001 \le b \le 0.1$); $Li_aMnG_bO_2$ (wherein, $0.90 \le a \le 1.8$ and $0.001 \le b \le 0.1$); $Li_aMn_2G_bO_4$ (wherein, $0.90 \le a \le 1.8$ and $0.001 \le b \le 0.1$); $QO_2$; $QS_2$; $LiQS_2$; $V_2O_5$; $LiV_2O_5$; $LiTO_2$; $LiNiVO_4$; $Li_{(3-f)}J_2(PO_4)_3$ ($0 \le f \le 2$); $Li_{(3-f)}Fe_2(PO_4)_3$ ($0 \le f \le 2$); and $LiFePO_4$.

In the above chemical formulas, A is Ni, Co, Mn or a combination thereof; R is Al, Ni, Co, Mn, Cr, Fe, Mg, Sr, V, a rare earth element or a combination thereof; D is O, F, S, P or a combination thereof; E is Co, Mn or a combination thereof; Z is F, S, P or a combination thereof; G is Al, Cr, Mn, Fe, Mg, La, Ce, Sr, V or a combination thereof; Q is Ti, Mo, Mn or a combination thereof; T is Cr, V, Fe, Sc, Y or a combination thereof; and J is V, Cr, Mn, Co, Ni, Cu or a combination thereof.

Of course, it is also possible to use one having a coating layer on the surface of the above-mentioned compound, or it is possible to use a mixture of the above-mentioned compound with a compound having a coating layer. The coating layer may include a coating element compound such as coating element oxide, hydroxide, coating element oxyhydroxide, coating element oxycarbonate or coating element hydroxycarbonate. The compounds forming these coating layers may be amorphous or crystalline. As a coating element included in the coating layer, Mg, Al, Co, K, Na, Ca, Si, Ti, V, Sn, Ge, Ga, B, As, Zr or a mixture thereof can be used. As the coating layer forming process, any coating method can be used as long as it can be coated by a method (e.g., spray coating or dipping method, etc.) that does not adversely affect the physical properties of the positive electrode active material by using these elements in the compound. Since this is a content that may be widely understood by those worked in the art, and thus, detailed descriptions thereof will be omitted.

The positive electrode current collector is typically fabricated to a thickness of 3 to 500 µm. The positive electrode current collector is not particularly limited as long as a corresponding battery has high conductivity without causing a chemical change in the battery, and for example, may be formed of stainless steel, aluminum, nickel, titanium, baked carbon, or aluminum, or a material formed by surface-treating a surface of stainless steel with carbon, nickel, titanium, silver, or the like. The current collector may have fine protrusions and depressions formed on a surface thereof to enhance adherence of a positive electrode active material, and may be formed in various forms such as a film, a sheet, a foil, a net, a porous body, a foaming body, and a non-woven fabric structure.

The detailed description concerning the binder and the conductive material is the same as described in the negative electrode.

Electrolyte

The electrolyte of the lithium secondary battery may be a liquid electrolyte (i.e., an electrolyte solution) or a solid electrolyte.

When the electrolyte of the lithium secondary battery is a liquid electrolyte, it includes a non-aqueous organic solvent and a lithium salt.

The non-aqueous organic solvent serves as a medium capable of moving ions that are involved in an electrochemical reaction of a battery. The non-aqueous organic solvent may include a carbonate-based, ester-based, ether-based, ketone-based, alcohol-based, or aprotic solvent. Examples of the carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and the like. As the ester-based solvent, methyl acetate, ethyl acetate, n-propyl acetate, 1,1-dimethylethylacetate, methylpropionate, ethylpropionate, γ-butyrolactone, decanolide, valerolactone, mevalonolactone, caprolactone, and the like. Examples of the ether-based solvent may include 1,2-dimethoxyethane (DME), dibutyl ether, tetraglyme, diglyme, dimethoxyethane, 2-methyltetrahydrofuran, tetrahydrofuran, and the like may be used. Examples of the ketone-based solvent may include cyclohexanone and the like. Examples of the alcohol-based solvent may include ethyl alcohol, isopropyl alcohol, and the like. Examples of the aprotic solvent may include nitriles such as R—CN (where R is a C2 to C20 linear, branched, or cyclic hydrocarbon group, a double bond, an aromatic ring, or an ether bond), amides such as dimethylformamide, dioxolanes such as 1,3-dioxolane, sulfolane, and the like.

The non-aqueous organic solvents may be used alone or in a mixture of two or more thereof. When the solvents are used in a combination of two or more, the mixing ratio thereof may be appropriately controlled according to the desired battery performance, which may be widely understood by those worked in the art.

In addition, when the carbonate-based solvent is used, it is favorable to use cyclic carbonate and chained carbonate in a mixture thereof. In this case, the cyclic carbonate and the chained carbonate are mixed at a volume ratio of 1:1 to 1:9, so that the performance of the electrolyte can be favorably exhibited.

The non-aqueous organic solvent may further include an aromatic hydrocarbon-based organic solvent in addition to the carbonate-based solvent. Here, the carbonate-based solvent and the aromatic hydrocarbon based organic solvent may be mixed at a volume ratio of 1:1 to 30:1.

As the aromatic hydrocarbon-based organic solvent, an aromatic hydrocarbon-based compound of the following Chemical Formula 1 may be used.

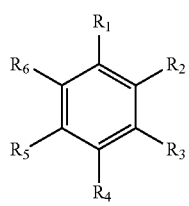

[Chemical Formula 1]

in the Chemical Formula 1, $R_1$ to $R_6$ are each independently hydrogen, a halogen, a C1 to C10 alkyl group, a C1 to C10 haloalkyl group, or a combination thereof.

The aromatic hydrocarbon-based organic solvent may include benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 1,2-difluorotoluene, 1,3-difluorotoluene, 1,4-difluorotoluene, 1,2,3-trifluorotoluene, 1,2,4-trifluorotoluene, chlorotoluene, 1,2-dichlorotoluene, 1,3-dichlorotoluene, 1,4-dichlorotoluene, 1,2,3-trichlorotoluene, 1,2,4-trichlorotoluene, iodotoluene, 1,2-diiodotoluene, 1,3-diiodotoluene, 1,4-diiodotoluene, 1,2,3-triiodotoluene, 1,2,4-triiodotoluene, xylene, and a combination thereof.

The non-aqueous electrolyte may further contain vinylene carbonate or an ethylene carbonate-based compound of the following Chemical Formula 2 in order to improve the lifetime of the battery:

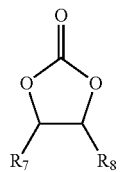

[Chemical Formula 2]

in the Chemical Formula 2, $R_7$ and $R_8$ are each independently hydrogen, a halogen group, a cyano group (CN), a nitro group ($NO_2$), or a C1-C5 fluoroalkyl group, and at least one of $R_7$ and $R_8$ is a halogen group, a cyano group (CN), a nitro group (NO2), or a C1-C5 fluoroalkyl group.

Representative examples of the ethylene carbonate-based compound may include difluoroethylene carbonate, chloroethylene carbonate, dichloroethylene carbonate, bromoethylene carbonate, dibromoethylene carbonate, nitroethylene carbonate, cyanoethylene carbonate, fluoroethylene carbonate, and the like. When the vinylene carbonate or the ethylene carbonate-based compound is further used, the use amounts thereof may be appropriately adjusted to improve the lifetime.

In the electrolyte of the lithium secondary battery, the lithium salt is dissolved in the organic solvent to act as a lithium ion supply source in the battery, thereby enabling a basic operation of a lithium secondary battery of one embodiment and promoting the movement of lithium ions between a positive electrode and a negative electrode.

As the lithium salt, a lithium salt widely applied to an electrolyte may be generally used. For example, as in the Experimental Example described later, lithium bis(fluorosulfonyl)imide (LiFSI) may be used, but additionally, $LiPF_6$, $LiBF_4$, $LiSbF_6$, $LiAsF_6$, $LiC_4F_9SO_3$, $LiClO_4$, $LiAlO_2$, $LiAlCl_4$, $LiN(C_xF_{2x+1}SO_2)(C_yF_{2y+1}SO_2)$ (where, x and y are a natural number), LiCl, LiI, $LiB(C_2O_4)_2$ (lithium bis(oxalato)borate; LiBOB) or a combination thereof may be used, without being limited thereto.

Further, in the electrolyte, the concentration of the lithium salt may be controlled within the range of 0.1 to 5.0M. Within this range, the electrolytes can have adequate conductivity and viscosity, so that the lithium ions can be effectively moved within the lithium secondary battery of the one embodiment. However, this is merely an example, and the present disclosure is not limited thereto.

The electrolyte may be in the form of being impregnated in a porous separator disposed between the negative electrode and the positive electrode. Here, the porous separator can be used without limitation as long as it separates the negative electrode and the positive electrode to provide a passage for moving lithium ions, and thus is normally used in a lithium battery. That is, those having low resistance to ion movement of the electrolyte and having excellent electrolyte-moisturizing capability can be used.

For example, the electrolyte may be selected from glass fiber, polyester, Teflon, polyethylene, polypropylene, polytetrafluoroethylene (PTFE) or a combination thereof, and it may be in the form of non-woven fabric or woven fabric. For example, polyolefin-based polymer separators such as polyethylene and polypropylene are mainly used for lithium ion batteries. A coated separator containing a ceramic component or a polymer material may be used to secure heat resistance or mechanical strength. Optionally, it may be used in a single-layer or multi-layer structure.

On the contrary, when the electrolyte of the lithium secondary battery is a solid electrolyte, the solid electrolyte that can be used is not particularly limited.

The lithium secondary battery of the one embodiment may not only be used in a unit cell used as a power source for a small device, but also it can be used as a unit cell in a medium or large-sized battery module including a plurality of battery cells. Furthermore, a battery pack including the battery module may be configured.

Advantageous Effects

The separator of one embodiment has excellent thermal stability and mechanical stability based on the stability-reinforced separator, and the pores of any one component of the substrate and the coating layer are filled with an ion conductive polymer, thereby securing ion conductivity while contributing to suppressing micro-short-circuit and improving lifetime characteristics of a lithium secondary battery.

DETAILED DESCRIPTION OF THE EMBODIMENTS

Figure 1:
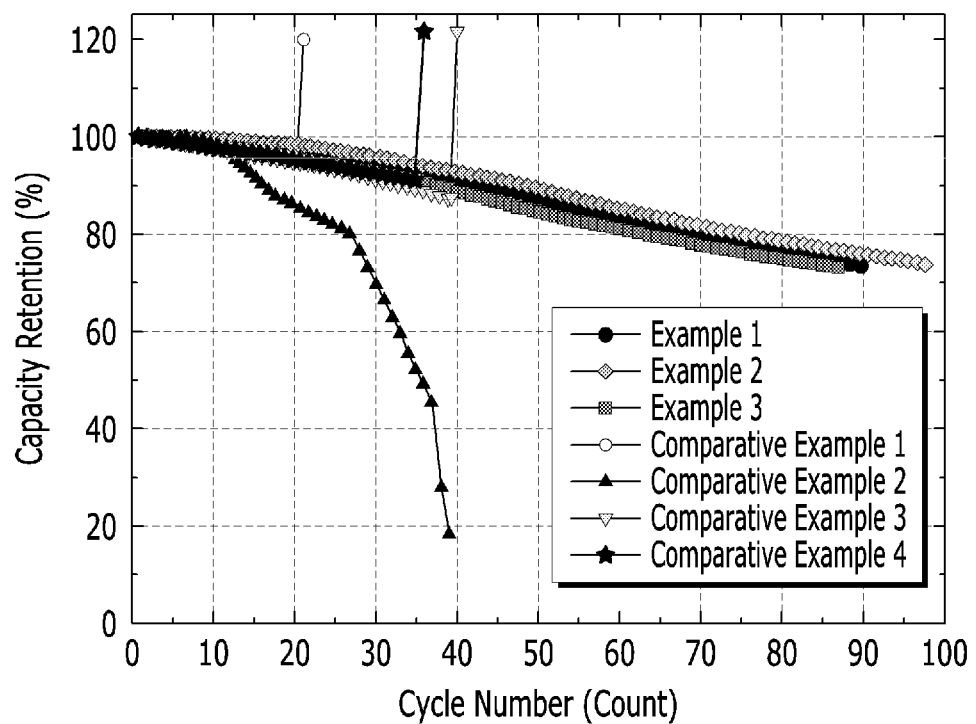
FIG. 1 shows the results of evaluating the electrochemical characteristics of each of the lithium secondary batteries of Examples 1 to 3 and Comparative Examples 1 to 3 described later.

Hereinafter, preferred examples of the present disclosure, comparative examples, and test examples for evaluating them are described. However, the following examples are only preferred examples of the present disclosure, and the present disclosure is not limited to the following examples.

Example 1 (Preparation of a Separator in which all of the Second Pores are Filled with F-Ionomer)

(1) Preparation of Separator

A polyethylene substrate (width*length*thickness: 40 mm*60 mm*5 um, porosity 40%) was prepared.

$Al_2O_3$ powder with a D50 particle diameter of 500 nm was used as the inorganic particles and PVdF was used as a binder. As the F-ionomer, a product (trade name: ACIPLEX®-S, Asahi Chemical), a kind of Nafion®-based material, was purchased and used.

The inorganic particles ($Al_2O_3$), the binder (PVdF), and the F-ionomer were mixed in a volume ratio of 1:1:1 in NMP (N-methyl-2-pyrrolidone) as the solvent to prepare a coating solution. In the total amount (100% by weight) of the coating solution containing the inorganic particles ($Al_2O_3$), the binder (PVdF), and the F-ionomer, the solid content was 50 wt. %.

The substrate was immersed in a coating solution containing the inorganic particles ($Al_2O_3$), the binder (PVdF), and the F-ionomer for 3 minutes, which was then taken out and dried at 80° C. for 180 minutes to obtain the separator of Example 1.

(2) Manufacture of Lithium Secondary Battery

A copper current collector having a square (thickness: 10 μm) having a cross section of 17 cm 2 was used as a negative electrode (Li free anode).

$LiNi_{0.6}Mn_{0.2}Co_{0.2}O_2$ as a positive electrode active material, carbon black as a conductive material, and polyvinylidene fluoride (PVDF) as a binder were used, respectively. To a mixture mixed with a positive electrode active material:conductive material:binder in a weight ratio of 94:2:4 was added NMP as a solvent to prepare a positive electrode active material slurry. The positive electrode active material slurry was coated to a thickness of 79 μm onto one surface of an aluminum current collector (thickness: 10 μm), which was dried, rolled, and then punched to a predetermined size to manufacture a positive electrode.

A bi-cell was prepared in which the separator of Example 1 was interposed between the negative electrode and the positive electrode. 3.5M LiFSI (lithium bis(fluorosulfonyl) imide) dissolved in 1,2-dimethoxyethane ($C_4H_{10}O_2$) was used as an electrolyte, and injected into the bi-cell.

For the rest, a process known in the art was used.

Example 2 (Preparation of a Separator in which all of the First Pores are Filled with F-Ionomer)

(1) Preparation of Separator

The substrate, inorganic particles, binder, F-ionomer, and solvent were the same as those used in Example 1.

The F-ionomer was dispersed in an NMP solvent to prepare an F-ionomer solution (in 100 wt. % of the solution, 20 wt. % of F-ionomer content). The substrate was immersed in the F-ionomer solution for 3 minutes, which was then taken out and dried at 80° C. for 180 minutes. Thereby, a substrate in which the first pores are filled by the F-ionomer was obtained.

Independently from this, the inorganic particles and the binder were mixed in a volume ratio of 5:1 in an NMP solvent to prepare a coating solution. In the total amount (100 wt. %) of the coating solution containing the inorganic particles and the binder, the content of the solid content was set to 40 wt. %.

In the coating solution containing the inorganic particles and the binder, the substrate in which the first pores were filled by the F-ionomer was immersed for 3 minutes, which was then taken out and dried at 80° C. for 180 minutes to obtain a separator of Example 2.

(2) Manufacture of Lithium Secondary Battery

A lithium secondary battery was manufactured in the same manner as in Example 1, except that the separator of Example 2 was used instead of the separator of Example 1.

Example 3 (Preparation of a Separator in which all of the Second Pores were Filled with F-Ionomer)

(1) Preparation of Separator

The separator of Example 3 was prepared in the same manner as in Example 1, except for the composition of the coating solution containing the inorganic particles ($Al_2O_3$), the binder (PVdF), and the F-ionomer.

Specifically, the inorganic particles ($Al_2O_3$), the binder (PVdF), and the F-ionomer were mixed in a volume ratio of 1:1:2 in NMP (N-methyl-2-pyrrolidone) as the solvent to prepare a coating solution. In the total amount (100 wt. %) of the coating solution containing the inorganic particles ($Al_2O_3$), the binder (PVdF), and the F-ionomer, the solid content was set to 60 wt. %.

(2) Manufacture of Lithium Secondary Battery

A lithium secondary battery was manufactured in the same manner as in Example 1, except that the separator of Example 3 was used instead of the separator of Example 1.

Comparative Example 1 (Preparation of a Separator in which all of the First Pores and all of the Second Pores were Opened)

(1) Preparation of Separator

The substrate, inorganic particles, binder, and solvent were the same as those used in Example 1.

The inorganic particles ($Al_2O_3$) and the binder (PVdF) were mixed in a volume ratio of 5:1 in NMP (N-methyl-2-pyrrolidone) as the solvent to prepare a coating solution. In the total amount (100 wt. %) of the coating solution containing the inorganic particles ($Al_2O_3$) and the binder (PVdF), the solid content was set to 40 wt. %.

The substrate was immersed in a coating solution containing the inorganic particles ($Al_2O_3$) and the binder (PVdF) for 3 minutes, which was then taken out and dried at 80° C. for 180 minutes to obtain a separator of Comparative Example 1.

(2) Manufacture of Lithium Secondary Battery

A lithium secondary battery was manufactured in the same manner as in Example 1, except that the separator of Comparative Example 1 was used instead of the separator of Example 1.

Comparative Example 2 (Preparation of a Separator in which all of the First Pores and all of the Second Pores were Filled with F-Ionomer)

(1) Preparation of Separator

An F-ionomer solution (in 100 wt. % of the solution, 30 wt. % of F-ionomer content) was prepared in the same manner as in Example 2.

Independently from this, a separator in which both the first and second pores were opened was prepared in the same manner as in Comparative Example 1.

In the F-ionomer solution, the separator in which both the first and second pores were opened was immersed for 3 minutes, and then taken out and dried at 80° C. for 180 minutes to obtain the separator of Comparative Example 2.

(2) Manufacture of Lithium Secondary Battery

A lithium secondary battery was manufactured in the same manner as in Example 1, except that the separator of Comparative Example 2 was used instead of the separator of Example 1.

Comparative Example 3 (Preparation of a Separator in which a Part of the Second Pore was Filled with F-Ionomer, and all of the First Pore and a Part of the Second Pore were Opened)

(1) Preparation of Separator

The separator of Comparative Example 3 was prepared in the same manner as in Example 1, except for the composition of the coating solution containing the inorganic particles ($Al_2O_3$), the binder (PVdF), and the F-ionomer.

Specifically, the inorganic particles ($Al_2O_3$), the binder (PVdF), and the F-ionomer were mixed in a volume ratio of 3:1:1 in NMP (N-methyl-2-pyrrolidone) as the solvent, to prepare a coating solution. In the total amount (100 wt. %) of the coating solution containing the inorganic particles ($Al_2O_3$), the binder (PVdF), and the F-ionomer, the solid content was set to 40 wt. %.

(2) Manufacture of Lithium Secondary Battery

A lithium secondary battery was manufactured in the same manner as in Example 1, except that the separator of Comparative Example 3 was used instead of the separator of Example 1.

Comparative Example 4 (Preparation of a Separator in which a Coating Layer is Formed Only on the Walls of the Pores by Performing Washing while Filling the First Pore and Second Pore)

(1) Preparation of Separator

The separator of Comparative Example 4 was prepared in the same manner as in Comparative Example 2, except that the separator in which both the first and second pores were opened was immersed in the F-ionomer solution of Comparative Example 2 for 3 minutes, then taken out, washed with water for 1 minute, and dried.

(2) Manufacture of Lithium Secondary Battery

A lithium secondary battery was manufactured in the same manner as in Example 1, except that the separator of Comparative Example 4 was used instead of the separator of Example 1.

Experimental Example 1 (Evaluation of Electrochemical Properties of Lithium Secondary Battery)

Charge/discharge cycles of each of lithium secondary batteries of Examples 1 to 3 and Comparative Examples 1 to 4 were performed under the following conditions. The discharge capacity according to the charge/discharge cycle of each lithium secondary battery was normalized to the discharge capacity of the first cycle, and the results are shown in FIG. 1.

Charge: 0.1C, CC/CV, 4.25V, 1/20C cut-off
Discharge: 0.5C, CC, 3.0 V, cut-off

Here, in order to increase the reliability of the experimental results, when charge/discharge experiments for each lithium secondary battery were conducted 5 times and micro-short circuit occurred two times or more, it was indicated as "whether or not micro-short circuit occurred: presence" in in Table 1 below. Further, in the case of "the cycle number at the point where the capacity retention rate reached 80% at 0.1C charge/0.5C discharge", the results obtained by the five charge/discharge experiments were arithmetically averaged and recorded in Table 1 below.

Independently from this, it was charged up to 4.25 V at 0.1 C and then discharged up to 2.5 V at 0.1 C under constant current (CC) conditions. The results of measuring the discharge capacity are also shown in Table 1 below.

TABLE 1

|  | whether or not micro-short circuit occurred | 0.1 discharge capacity (mAh) | Cycle numbers at the point where the capacity retention reached 80% during 0.1 C charge/0.5 C discharge |
|---|---|---|---|
| Example 1 | absence | 118 | 67 |
| Example 2 | absence | 120 | 73 |
| Example 3 | absence | 118 | 62 |
| Comparative Example 1 | presence | 120 | 77 (however, micro-short circuit occurred at the 20th cycle in a large number of samples) |
| Comparative Example 2 | absence | 105 | 26 |
| Comparative Example 3 | presence | 119 | 68 (however, micro-short circuit occurred at the 40th cycle in a large number of samples) |
| Comparative Example 4 | presence | 121 | 78 (however, micro-short circuit occurred at the 36th cycle in a large number of samples) |

Referring to Table 1 and FIG. 1, when a separator (Comparative Example 1) in which all of the first pores and all of the second pores were opened was used, it can be confirmed that a micro-short circuit has occurred.

On the other hand, when either one of all of the first pores and all of the second pores were filled (Examples 1 to 3), and when all of the first pores and all of the second pores were filled (Comparative Example 2), it can be confirmed that no micro-short circuit has occurred.

Thereby, in order to prevent a micro-short circuit due to the growth of the metal column during driving of the lithium secondary battery, it can be seen that it is necessary to fill the pores (first and second pores) that are the portions vulnerable to the attack of the metal columns.

However, compared to the case where all of the first pores and all of the second pores were filled (Comparative Example 2), when either one of all of the first pores and all of the second pores were filled (Examples 1 to 3), it can be seen that the 0.1 C discharge capacity was larger, and after more cycles were performed at 0.1 C charge/0.5 C discharge, the capacity retention rate reached 80%.

Thereby, in order to secure a movement passage for lithium ions and secure an appropriate discharge capacity and lifetime while preventing a micro-short circuit due to the growth of a metal column during driving of the lithium secondary battery, it can be seen that all of the first pores and all of the second pores are not filled, but one of these need to be selectively filled.

On the other hand, when all of the first pores and a part of the second pores are opened (Comparative Example 3), and when a separator in which only the inner wall of the pores is coated through cleaning even if the first pores and the second pores are filled (Comparative Example 4) is used, it can be confirmed that a micro-short circuit occurs in the same manner as in the film in which all the first pores and all the second pores are opened (Comparative Example 1).

Thus, even when either one of the first pores and the second pores is selectively filled, it can be seen that it is important to fill all of the selected pores. In particular, when attempting to selectively fill the second pores, all of the selected second pores may be filled by controlling the mixing ratio of the organic component (the binder (PVdF) and the F-ionomer) and the inorganic component (inorganic particles $Al_2O_3$) to an appropriate range.

Experimental Example 2 (Observation of Whether Micro-Short Circuit Occurred)

In the lithium secondary battery of Comparative Example 1 that was driven according to Experimental Example 1, the cell in which the internal short circuit occurred at the 20th cycle was decomposed to recover the separator. The separator of Comparative Example 1 thus recovered was photographed with a digital camera and a digital microscope (Dino-Lite Digital Microscope), respectively, and each photographed image is shown in FIG. 2.

Figure 2:
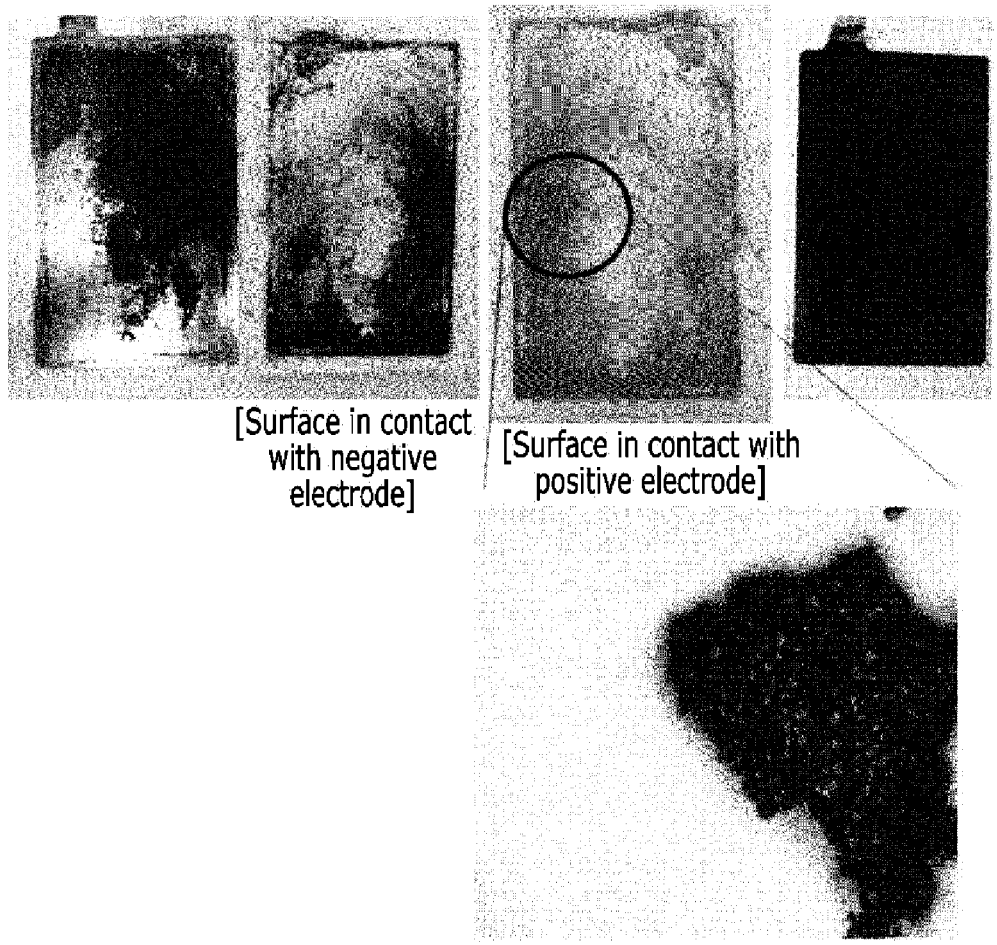
FIG. 2 shows the observation of the separator recovered during driving of the lithium secondary battery of Comparative Example 1 described later.

Specifically, with respect to the recovered separator of Comparative Example 1, the both surfaces were separated based on the center of thickness, photographed with a digital camera, and shown in FIG. 2. In the order from left to right of FIG. 2, in the both sides of the recovered separator, it corresponds to the outside and inside of the surface in contact with the negative electrode, and the inside and outside of the surface in contact with the positive electrode. The inset of FIG. 2 corresponds to an image taken with a digital microscope for a portion marked by a circle in the inside of the surface in contact with the positive electrode.

It can be seen that the separator of Comparative Example 1 is vulnerable to the attack of the metal column grown from the negative electrode because all of the first pores and all of the second pores are opened. Thus, the attacked part is observed in the inset of FIG. 2.

Experimental Example 3 (Evaluation of Ionic Conductivity of Separator)

Each of the separators of Examples 1 to 3 and Comparative Examples 1 to 4 was cut into a circular shape (cross-sectional area: 1.7671 cm 2), and then placed between two sheets of stainless steel (SUS) to fabricate a coin cell. Electrochemical Impedance Spectroscopy was performed under conditions of amplitude 10 mV and scan range 10 Khz to 100 KHz at 60° C. using an analysis device (VMP3, Bio logic science instrument). Based on this, the ionic conductivity was calculated and shown in Table 2 below.

TABLE 2

|  | Ionic conductivity (S/cm) |
|---|---|
| Example 1 | $6.5 * 10^{-4}$ |
| Example 2 | $9.1 * 10^{-4}$ |
| Example 3 | $6.0 * 10^{-4}$ |
| Comparative Example 1 | $10.5 * 10^{-4}$ |
| Comparative Example 2 | $1 * 10^{-4}$ |
| Comparative Example 3 | $9.5 * 10^{-4}$ |
| Comparative Example 4 | $12 * 10^{-4}$ |

According to Table 2 above, in terms of ion conductivity, the separator in which all of the first pores and all of the second pores are opened (Comparative Example 1), or the separator in which all of the first pores and a part of the second pores are opened (Comparative Example 3), and the separator in which only the inner wall of the pores is coated through cleaning even if the first pores and the second pores are filled (Comparative Example 4) are advantageous, but mini-short circuits often occur at the 20th to 40th cycles of the battery. In view of these results, it is evaluated that this separator can be commercialized in a battery configuration in which short is not frequently generated, but it cannot be commercialized in a battery configuration in which short is frequently generated.

On the other contrary, when all of the first pores and all of the second pores are filled (Comparative Example 2), the ionic conductivity is significantly reduced as compared with the case where one of these is filled (Examples 1 to 3). It is confirmed that the battery lifetime is reduced due to this. This is in line with the fact that when all of the first pores and all of the second pores are filled, the space in which the lithium secondary battery is impregnated with an electrolyte to provide an ion passage for lithium is significantly reduced.

On the other hand, in the separator in which all the first pores and all the second pores are opened (Comparative Example 1), or the separator in which either of them is filled (Examples 1 to 3), the ionic conductivity and lifetime characteristics are at similar levels. This is due to the use of an ion conductive polymer having excellent ionic conductivity, particularly F-ionomer, as a means for selectively filling either one of all of the first pores and all of the second pores.

In the case where either one of all of the first pores and all of the second pores are filled (Examples 1 to 3), it has been confirmed that the ionic conductivity and lifetime characteristics of Example 2 in which all of the first pores are selectively filled are the most excellent.

The reason why the separator which all of the first pores are selectively filled has higher ionic conductivity compared to the separator in which all of the second pores are selectively filled has higher ionic conductivity is because the volume occupied by the layer in which the pores are filled is small.

However, even if all of the second pores are selectively filled, it is sufficient to secure the ionic conductivity of the separator. Of course, filling all of the first pores and the second pores (Comparative Example 2) is disadvantageous in terms of ionic conductivity and lifetime characteristics.

The invention claimed is:

1. A separator for a lithium secondary battery comprising:
a substrate having a plurality of first pores formed therein;
a coating layer deposited on a surface of the substrate, including inorganic particles and a binder, and having a plurality of second pores formed therein; and
an ion conductive polymer that fills the first pores,
wherein the ion conductive polymer comprises a compound represented by Formula 1:

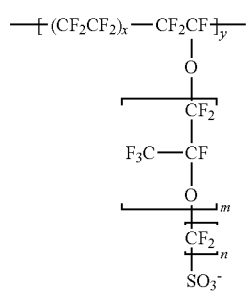

[Formula 1]

in Formula 1, m is 0 or 1, 3≤n≤5, and 1.5≤x≤14.

2. The separator for a lithium secondary battery according to claim 1, wherein
the ion conductive polymer is contained in the coating layer to fill the plurality of second pores, and
a sum of volumes of the ion conductive polymer and the binder with respect to a total volume of the coating layer containing the ion conductive polymer is 50% by volume or more and 100% by volume or less.

3. The separator for a lithium secondary battery according to claim 1, wherein
the coating layer is deposited on both surfaces of the substrate and inside the substrate, and
the coating layer is deposited inside the substrate and fills a part of the first pores with the inorganic particles and the binder, and the second pores are located in a remaining part of the first pores.

4. The separator for a lithium secondary battery according to claim 1, wherein
the separator has an ionic conductivity at 20 to 30° C. of $5.0*10^{-4}$ S/cm.

5. A lithium secondary battery comprising:
a positive electrode;
a negative electrode; and
the separator of claim 1 interposed between the negative electrode and the positive electrode.

6. The lithium secondary battery according to claim 5, wherein
the negative electrode comprises:
a lithium free negative electrode consisting of a copper current collector; or
a copper current collector a lithium metal layer located on the copper current collector.

7. The lithium secondary battery according to claim 5, wherein
when charging the lithium secondary battery with a constant current of 0.1 C in a temperature range of 20 to 30° C. until reaching 4.25 V and then discharging the lithium secondary battery with a constant current of 0.5C until reaching 3 V is referred to as one charge/discharge cycle,
at a point of a time a capacity retention rate according to the following Equation 1 reaches 80%, wherein n is 50 or more, Capacity retention rate (%)=100*{Discharge capacity after n cycles}/{Discharge capacity after 1 cycle}. [Equation 1]

8. A method for manufacturing the separator for a lithium secondary battery according to claim 1 comprising:
preparing the substrate including the plurality of first pores therein;
forming the coating layer including the inorganic particles, the binder, and the plurality of second pores on the surface of the substrate; and
filling first pores with the ion conductive polymer.

9. The method for manufacturing a separator for a lithium secondary battery according to claim 8,
wherein the filling the first pores is performed simultaneously with the forming the coating layer, and comprises:
immersing the substrate in a solution containing the inorganic particles, the binder, and the ion conductive polymer; and
recovering and drying the substrate immersed in the solution containing the inorganic particles, the binder, and the ion conductive polymer.

10. The method for manufacturing a separator for a lithium secondary battery according to claim 8, wherein the filling all the first pores is performed after the preparing the substrate and before the forming the coating layer, and comprises:

immersing the substrate in a solution containing the ion conductive polymer; and recovering and drying the substrate immersed in the solution containing the ion conductive polymer.

11. The method for manufacturing a separator for a lithium secondary battery according to claim 10, wherein the forming the coating layer comprises:

immersing the substrate obtained through the filling the first pores in a solution containing the inorganic particles and the binder; and recovering and drying the substrate immersed in the solution containing the inorganic particles and the binder.

* * * * *